(12) United States Patent
Koyama et al.

(10) Patent No.: US 10,989,848 B2
(45) Date of Patent: Apr. 27, 2021

(54) HEAT-BLOCKING FILTER AND MONITORING SYSTEM

(71) Applicant: PANASONIC INTELLECTUAL PROPERTY MANAGEMENT CO., LTD., Osaka (JP)

(72) Inventors: Shinzo Koyama, Osaka (JP); Motonori Ishii, Osaka (JP); Shigeru Saitou, Kyoto (JP); Masato Takemoto, Osaka (JP); Tsuyoshi Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 443 days.

(21) Appl. No.: 16/010,954

(22) Filed: Jun. 18, 2018

(65) Prior Publication Data

US 2018/0306954 A1 Oct. 25, 2018

Related U.S. Application Data

(63) Continuation of application No. PCT/JP2017/002252, filed on Jan. 24, 2017.

(30) Foreign Application Priority Data

Jan. 29, 2016 (JP) .............................. JP2016-016679

(51) Int. Cl.
*G02B 5/28* (2006.01)
*G02B 5/26* (2006.01)
(Continued)

(52) U.S. Cl.
CPC .............. *G02B 5/282* (2013.01); *B32B 17/00* (2013.01); *B60J 1/20* (2013.01); *G01S 7/481* (2013.01);
(Continued)

(58) Field of Classification Search
CPC ...................................................... G02B 5/282
See application file for complete search history.

(56) References Cited

U.S. PATENT DOCUMENTS 4,583,815 A 4/1986 Taga et al.
2002/0182422 A1* 12/2002 Garrett .............. B32B 17/10036
428/437

(Continued)

FOREIGN PATENT DOCUMENTS

EP 0 520 720 A1 12/1992
EP 1 970 356 A1 9/2008
(Continued)

OTHER PUBLICATIONS

Extended European Search Report dated Jan. 23, 2019, issued in corresponding European Patent Application No. 17744164.9.
(Continued)

*Primary Examiner* — Hovhannes Baghdasaryan
(74) *Attorney, Agent, or Firm* — McDermott Will and Emery LLP

(57) ABSTRACT

Heat-blocking filter is a heat-blocking filter to be installed in a window glass of a vehicle. The heat-blocking filter substantially transmits visible light and infrared light in a first wavelength range, and substantially blocks infrared light outside the first wavelength range.

11 Claims, 11 Drawing Sheets

(51) Int. Cl.

| | | |
|---|---|---|
| *G01S 7/481* | (2006.01) | |
| *H04N 7/18* | (2006.01) | |
| *G01S 17/89* | (2020.01) | |
| *B32B 17/00* | (2006.01) | |
| *G02B 5/20* | (2006.01) | |
| *G01S 17/931* | (2020.01) | |
| *B60J 1/20* | (2006.01) | |
| *G01S 7/487* | (2006.01) | |
| *B32B 17/10* | (2006.01) | |
| *C03C 17/00* | (2006.01) | |
| *G01S 17/08* | (2006.01) | |
| *B60J 1/00* | (2006.01) | |
| *B60J 1/02* | (2006.01) | |
| *B60J 1/18* | (2006.01) | |

(52) U.S. Cl.
CPC ............ *G01S 7/4876* (2013.01); *G01S 17/89* (2013.01); *G01S 17/931* (2020.01); *G02B 5/208* (2013.01); *G02B 5/26* (2013.01); *G02B 5/28* (2013.01); *H04N 7/18* (2013.01); *H04N 7/181* (2013.01); *B32B 17/10036* (2013.01); *B60J 1/001* (2013.01); *B60J 1/02* (2013.01); *B60J 1/18* (2013.01); *B60Y 2400/3015* (2013.01); *C03C 17/00* (2013.01); *G01S 17/08* (2013.01)

(56) References Cited

U.S. PATENT DOCUMENTS

| | | | |
|---|---|---|---|
| 2005/0269481 A1* | 12/2005 | David | G02B 27/01 |
| | | | 250/208.1 |
| 2008/0273240 A1 | 11/2008 | Danzebrink et al. | |
| 2011/0027515 A1 | 2/2011 | Melcher et al. | |
| 2015/0373278 A1 | 12/2015 | Hattori et al. | |
| 2016/0085002 A1* | 3/2016 | Tanaka | B32B 2367/00 |
| | | | 349/193 |

FOREIGN PATENT DOCUMENTS

| | | |
|---|---|---|
| GB | 2126256 A | 3/1984 |
| JP | S59-7043 A | 1/1984 |
| JP | S59-031147 A | 2/1984 |
| JP | 2004-101405 A | 4/2004 |
| JP | 2005-535220 A | 11/2005 |
| JP | 2010-168042 A | 8/2010 |
| JP | 2011-502090 A | 1/2011 |
| JP | 2014-171214 A | 9/2014 |
| WO | 99/36808 A1 | 7/1999 |
| WO | 2006/058870 A1 | 6/2006 |
| WO | 2014/191320 A1 | 12/2014 |

OTHER PUBLICATIONS

International Search Report issued in International Application No. PCT/JP2017/002252 dated Apr. 25, 2017.

\* cited by examiner

HEAT-BLOCKING FILTER AND MONITORING SYSTEM

CROSS REFERENCE TO RELATED APPLICATIONS

This application is a U.S. continuation application of PCT International Patent Application Number PCT/JP2017/002252 filed on Jan. 24, 2017, claiming the benefit of priority of Japanese Patent Application Number 2016-016679 filed on Jan. 29, 2016, the entire contents of which are hereby incorporated by reference.

BACKGROUND

1. Technical Field

The present disclosure relates to a heat-blocking filter and a monitoring system.

2. Description of the Related Art

In recent years, efforts have been made to enhance the heat-blocking effect of vehicle window glass in order to prevent the rising of temperature inside a vehicle. The cause of heat is mainly light having a longer wavelength than visible light. As such, as disclosed in Japanese Unexamined Patent Application Publication No. 59-7043, for example, providing window glass with a characteristic of blocking light having a longer wavelength than visible light allows a rider to see outside the vehicle without any problem, while making it possible to block light which has a longer wavelength than near-infrared light and is the main cause of heat.

Meanwhile, in recent years, cameras, and the like, for monitoring the outside of a vehicle are being attached inside vehicles. In particular, when the camera has a characteristic of near-infrared light sensitivity, emitting near-infrared light at night enables monitoring by capturing images of the outside of the vehicle from inside the vehicle.

However, with the characteristic of glass such as that in Japanese Unexamined Patent Application Publication No. 59-7043, there is the problem that light intensity is attenuated as the near-infrared light passes through the window glass, and thus making it inadequate for night-time monitoring. In view of this, as in Japanese Unexamined Patent Application Publication (Translation of PCT Application) No. 2011-502090, for example, it has been proposed that changing the base material of only the portion of the window glass in front of a camera disposed inside a vehicle to allow only near-infrared light to be transmitted, for example, would make it possible to use a near-infrared camera. However, since the process of removing the base material requires special processing, there is the problem of increased manufacturing cost.

SUMMARY

In view of this, the present disclosure provides a heat-blocking filter that is capable of being suitably applied to a system that monitors the outside of a vehicle, while enhancing heat-blocking effect.

A heat-blocking filter according to one aspect of the present disclosure is a heat-blocking filter to be installed in a window glass of a vehicle. The heat-blocking filter substantially transmits visible light and infrared light in a first wavelength range, and substantially blocks infrared light outside the first wavelength range.

Accordingly, it is possible to realize a heat-blocking filter capable of substantially blocking heat while a camera or distance measuring device using near-infrared light is used.

It should be noted that "substantially transmits" means having an average transmissivity of at least 70% for light in a wavelength range to be transmitted. Furthermore, "substantially blocks" means having an average transmissivity of at most 10% for light in a wavelength range to be blocked.

Furthermore, the first wavelength range may be from 700 nm to 1100 nm, inclusive.

Accordingly, it is possible to use a device including a light-emitting element realized by using silicon which is sensitive up to 1100 nm. Since a device using silicon can be fabricated at low cost, industrial value can be enhanced.

Furthermore, the first wavelength range may be from 900 nm to 1000 nm, inclusive.

Accordingly, it is possible to use light of a wavelength range in which light from the sun is attenuated in the atmosphere. Since light from the sun is attenuated, the heat-blocking filter can be applied to a night vision camera that captures images or a device that measures distance by having near-infrared light actively emitted even in daytime.

Furthermore, the first wavelength range may have a half-value width of at least 0.8 nm and at most 40 nm.

Accordingly, even when light emission wavelength variation and wavelength deviation due to temperature change occur between light-emitting elements, there is no attenuation in the light-receiving element and background light can be blocked to the fullest. Therefore, a filter that transmits near-infrared light can be realized.

Furthermore, the first wavelength range may be a wavelength range within which infrared light incident on the window glass at a predetermined incidence angle range is transmitted.

Accordingly, even when light entering a camera provided inside the cabin passes at various angles when passing through the window glass, reflection of light and attenuation of light intensity can be suppressed. Therefore, light can be received with high sensitivity by a camera provided inside the cabin.

Furthermore, a monitoring system according to an aspect of the present disclosure is a monitoring system that monitors an outside of a vehicle, and includes: the window glass to which the heat-blocking filter having the above-described features is installed; a light-emitting module that emits the infrared light having a wavelength in the first wavelength range of the heat-blocking filter; and a light-receiving module that receives and converts the infrared light having the wavelength to a signal.

Accordingly, even when a near-infrared light camera is disposed inside the vehicle, deterioration of sensitivity is suppressed while enhancing the heat-blocking effect. Therefore, it is possible to capture images of the outside of the vehicle with high sensitivity.

Furthermore, the light-emitting module may be disposed inside a cabin of the vehicle.

Accordingly, since the camera and the light source can be disposed close to each other, the length of wiring can be shortened. Therefore, for example, when it is necessary to synchronize the light source and the camera in order to measure distance, adjustments for such synchronization can be performed easily.

Furthermore, the light-emitting module may be disposed outside a cabin of the vehicle.

Accordingly, by disposing the light source outside the cabin, the number of times that light has to pass through the window glass from the light source up to the light-receiving element is halved compared to when the light source is disposed inside the cabin, and thus the amount of attenuation of the light emitted by the light source can be reduced.

Furthermore, the monitoring system may include: an arithmetic operation unit that measures a distance between the vehicle and a subject present outside the cabin of the vehicle, based on a time from when near-infrared light is emitted by the light-emitting module to when the near-infrared light reflected by the subject is received by the light-receiving module.

Accordingly, by being able to measure distance, it is possible to realize improvements in safety such as being able to apply control to stop the vehicle or turn the steering wheel to avoid collision with the subject when there is a subject nearby.

Furthermore, the monitoring system may include a camera including a plurality of light-emitting modules arranged in rows and columns, each of the plurality of light-emitting modules being the light-emitting module. The camera may obtain an image of the subject.

Accordingly, since images and distance can be obtained simultaneously, it becomes possible to recognize what an object is to a higher degree, and thus more advanced vehicle braking can be executed.

Furthermore, the light-receiving module may include a narrow-band filter that substantially transmits infrared light in a second wavelength range narrower than the first wavelength range.

Accordingly, the near-infrared wavelength band of the narrow-band filter provided in a camera can be obtained by multiplication with the near-infrared wavelength band transmitted by the heat-blocking filter, design freedom for both filters is increased, and thus low-cost filters can be provided.

Furthermore, the monitoring system may include a refractive component that refracts a light ray incident on the window glass to a desired incidence angle, the refractive component being disposed on a face of the window glass on a reverse side of a face to which the heat blocking filter is installed.

Accordingly, it is possible to refract light rays to the appropriate direction, and guarantee the desired incidence angle onto the camera.

Furthermore, the refractive component may comprise a plurality of refractive components that are stacked.

Accordingly, since the number of refractive components to be stacked can be changes as necessary, the angle of refraction of light rays can be adjusted by changing the number of refractive components, as necessary, in accordance with the angle of the window glass.

Furthermore, in at least one cross section of the refractive component, a face of the refractive component on a reverse side of a face disposed on the window glass may be inclined with respect to the face disposed on the window glass.

Accordingly, it is possible to refract light rays to a more appropriate direction, and guarantee the desired incidence angle onto the camera.

The present disclosure can provide a heat-blocking filter that is capable of being suitably applied to a system that monitors the outside of a vehicle, while enhancing heat-blocking effect.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, exemplary embodiments of the present disclosure will be specifically described with reference to the drawings. Substantially identical components are assigned the same reference signs, and there are instances where description is omitted. It should be noted that each of the subsequently-described exemplary embodiments show a specific example. The numerical values, shapes, materials, structural components, the arrangement and connection of the structural components, steps, the processing order of the steps, etc. shown in the following exemplary embodiments are mere examples, and are not intended to limit the scope of the present disclosure. Furthermore, among the structural components in the following embodiments, components not recited in any one of the independent claims which indicate the broadest concepts of the present disclosure are described as arbitrary structural components.

Embodiment

A monitoring system according to this embodiment is a system that monitors the outside of a vehicle. The monitoring system includes a light source that emits near-infrared light and a camera that receives near-infrared light. The monitoring system monitors the situation outside a vehicle by way of the light source emitting near-infrared light and the camera inside the vehicle image-capturing (i.e., receiving) reflected light which has been reflected by an object and has passed through the window glass of the vehicle. Furthermore, a heat-blocking film that blocks light of a predetermined wavelength (for example, light other than near-infrared light) is provided to the window glass of the vehicle.

Accordingly, since only light of a predetermined wavelength is transmitted by the window glass of the vehicle, the effects of the light of another wavelength can be reduced, and thus the situation outside the vehicle can be accurately image-captured from inside the vehicle.

1. Configuration of Heat-Blocking Filter

Figure 1:
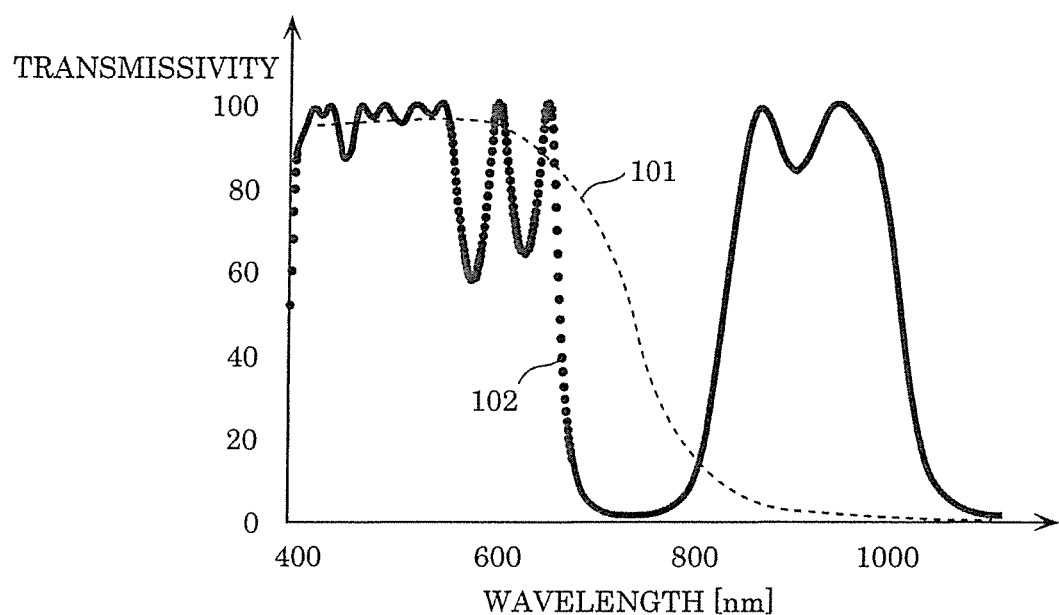
FIG. 1 is a graph illustrating transmissivity of a heat-blocking filter.

First, the configuration of a heat-blocking filter according to this embodiment will be described. FIG. 1 is a graph illustrating transmissivity of heat-blocking filter 10 according to this embodiment. In FIG. 1, curve 101 represents transmissivity of a conventional heat-blocking filter during perpendicular incidence. The conventional heat-blocking filter having the characteristic represented by curve 101 is intended to transmit visible light and improve the heat-blocking effect inside a vehicle. Therefore, transmissivity of light having a wavelength greater than or equal to near-infrared light is low. It should be noted that the wavelength of visible light is approximately 380 nm to 750 nm, and the wavelength of near-infrared light is approximately 750 nm to 1400 nm. Furthermore, near-infrared light corresponds to the infrared light in a first wavelength range in the present disclosure.

On the other hand, transmissivity of heat-blocking filter 10 according to this embodiment during perpendicular incidence is represented by curve 102. Heat-blocking filter 10 includes the two transmission bands for visible light and near-infrared light, and thus substantially transmits visible light and near-infrared light, and substantially blocks infrared light outside the first wavelength range. Here, "substantially transmits" means an average transmissivity of at least 70% for light in the wavelength range to be transmitted. Furthermore, "substantially blocks" means an average transmissivity of at most 10% for light in the wavelength range to be blocked.

It should be noted that it is sufficient that the transmissivity characteristic of heat-blocking filter 10 for visible light be a transmissivity within a range permitted by law. Since a wavelength in the near-infrared light transmission band can pass through the window glass, attenuation of near-infrared light can be reduced even when a camera, which includes light-receiving elements capable of receiving near-infrared light, and a light source, which emits near-infrared light, are disposed inside the vehicle.

Figure 2:
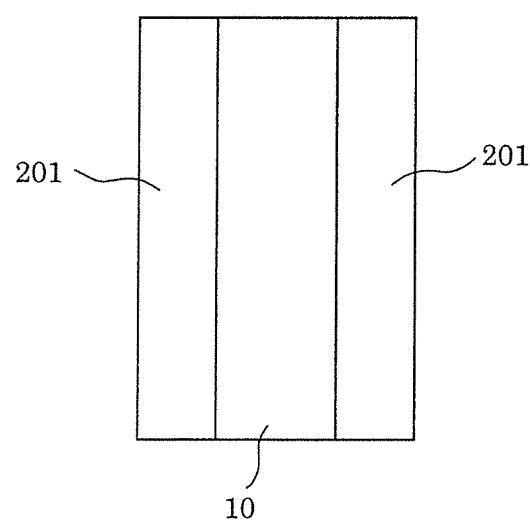
FIG. 2 is an outline view illustrating a configuration of a heat-blocking filter.

FIG. 2 is an outline view illustrating a configuration of heat-blocking filter 10. Heat-blocking filter 10 is formed from a multilayer film including a silicon dioxide thin-film and a titanium oxide thin-film. As illustrated in FIG. 2, there are instances where heat-blocking filter 10 is installed by being sandwiched from both sides by glass member 201. By doing so, heat-blocking filter 10 is not damaged during normal use, and thus its transmissivity characteristic is maintained. Furthermore, if heat-blocking filter 10 is resistant to abrasion, instead of sandwiching both sides of heat-blocking filter 10 between glass members 201, an installation method in which one side of heat-blocking filter 10 is stuck onto glass member 201 may be adopted.

Figure 3:
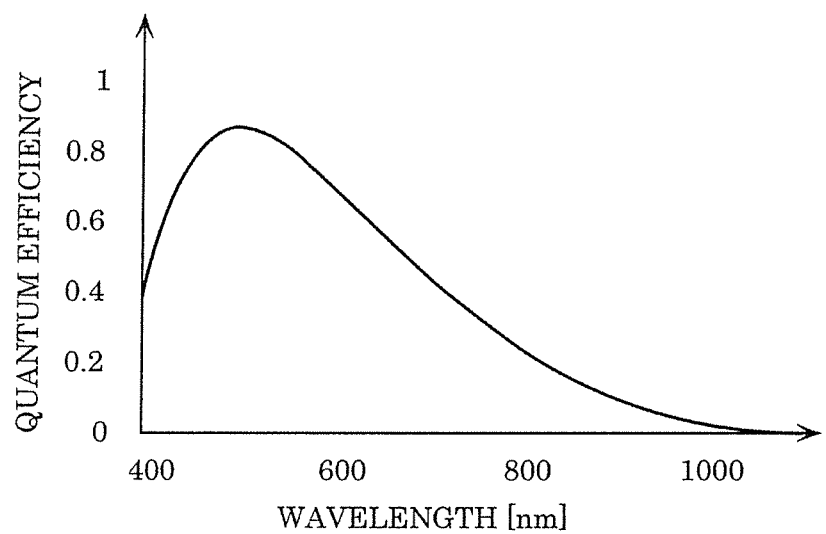
FIG. 3 is a graph illustrating silicon sensitivity.

FIG. 3 is a graph illustrating sensitivity of silicon with respect to the wavelength of light. Here, near-infrared light is infrared light in the first wavelength range. As illustrated in FIG. 3, light in the first wavelength range may refer to, for example, light in a wavelength range detectable by silicon when silicon is used as a light-receiving element. Light of a wavelength detectable by silicon refers to a light having a wavelength of at least 700 nm and at most 1100 nm, for example. Accordingly, heat-blocking filter 10 blocks light of a wavelength outside the at least 700 nm and at most 1100 nm wavelength range. Therefore, light-receiving elements using an inexpensive silicon material can be used in a camera capable of receiving near-infrared light.

Figure 4:
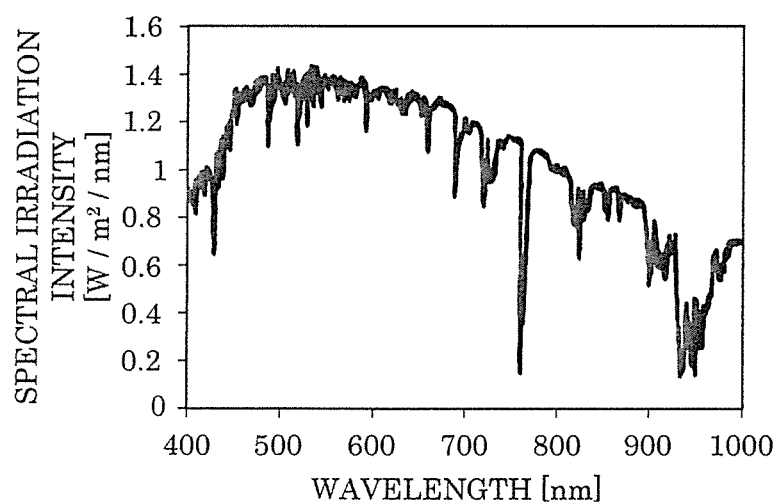
FIG. 4 is a graph illustrating solar spectral irradiation intensity.

Furthermore, FIG. 4 is a graph illustrating the solar spectral irradiation intensity of heat-blocking filter 10. As illustrated in FIG. 4, light having a wavelength of at least 900 nm and at most 1000 nm is a light in which sunlight intensity is low. Therefore, even if near-infrared light is emitted during daytime, as long as it is in the wavelength range of from 900 nm to 1000 nm, a camera that receives near-infrared light while suppressing the effects of sunlight can be used.

Furthermore, the half-value width of the first wavelength range may be, for example, from 0.8 nm to 40 nm, inclusive. This is because, when a surface light-emitting device is used, the half-value width of the first wavelength range needs to be greater than or equal to 0.8 nm which is the typical value of the half-value width of a wavelength. Furthermore, the change in output wavelength with respect to a change in temperature is 0.07 nm. Furthermore, when guaranteeing a 100° C. temperature change during use, the change in output wavelength is 7 nm. Furthermore, wavelength variations originating from manufacturing issues are related to variation within the surface of semiconductor wafers or between lots, and the range of variation is approximately ±15 nm. By setting the half-value width of the first wavelength range to a 40 nm wavelength range, a filter that transmits near-infrared light can be realized even when consideration is given to the above-described output wavelength variation and temperature change.

2. Configurations of the Monitoring System

Next, configurations of the monitoring system according to this embodiment will be described.

[2-1. Configuration 1]

Figure 5:
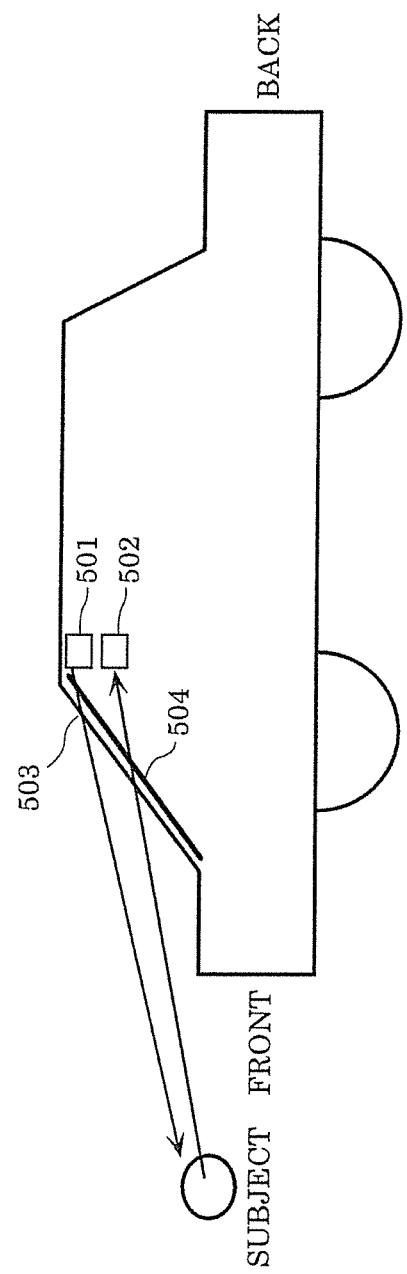
FIG. 5 is a diagram illustrating an example of a monitoring system installed in a vehicle.

FIG. 5 illustrates an example of a monitoring system provided in a vehicle. The monitoring system illustrated in FIG. 5 includes light-receiving element 501, light source 502, and windshield 503 on a front side of the vehicle, to which heat-blocking filter 10 is installed. Light-receiving element 501, light source 502, and windshield 503 correspond to the light-receiving module, the light-emitting module, and the window glass in the present disclosure.

As illustrated in FIG. 5, light source 502 which emits near-infrared light and light-receiving element 501 which receives near-infrared light are disposed inside the vehicle cabin. Heat-blocking filter 504 described in FIG. 1 is installed in windshield 503 located at the front. The above-described arrangement enables heat-blocking filter 504 to serve as a filter having a high heat-blocking effect while making it possible to observe the outside of the vehicle using light source (light-emitting element) 502 which emits near-infrared light and light-receiving element 501. Observation referred to here is near-infrared image-capturing, distance measuring using near-infrared light, etc., and may be anything that is for observing the outside of a vehicle using elements that emit and receive near-infrared light. For example, the monitoring system according to this embodiment may include arithmetic operation unit 804 (see FIG. 8) which measures the distance between the vehicle and a subject present outside the cabin of the vehicle, and thus may obtain images of the subject simultaneously with the measurement of distance.

[2-2. Configuration 2]

Figure 6:
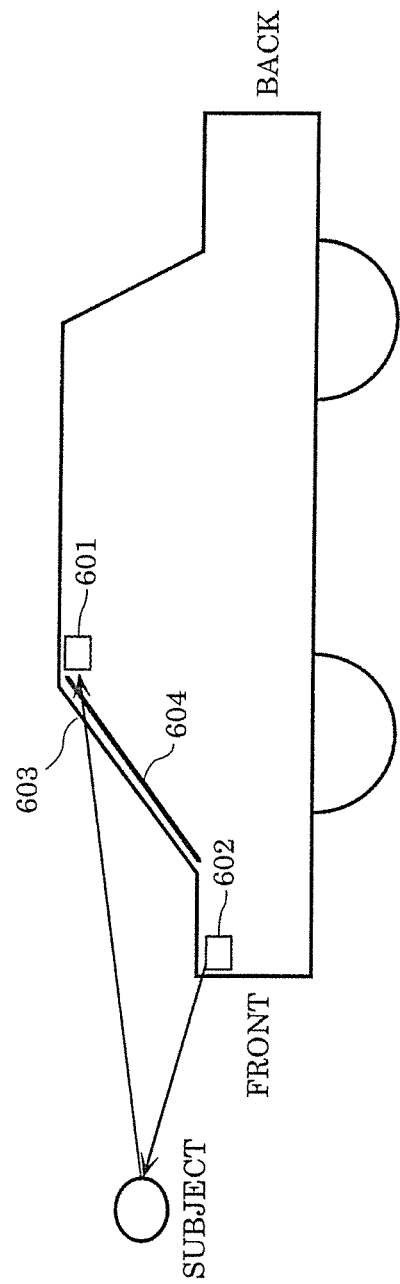
FIG. 6 is a diagram illustrating another example of a monitoring system installed in a vehicle.

Furthermore, FIG. 6 is a diagram illustrating another example of a monitoring system according to this embodiment. The monitoring system illustrated in FIG. 6 includes light-receiving element 601, light source 602, and windshield 603 to which heat-blocking filter 604 is installed. Light-receiving element 601, light source 602, and windshield 603 correspond to the light-receiving module, the light-emitting module, and the window glass according to the present disclosure.

The monitoring system illustrated in FIG. 6 is different from the monitoring system illustrated in FIG. 5 in that light source 602 which emits near-infrared light is disposed outside the cabin. By disposing light source 602 outside the cabin, the number of times the near-infrared light emitted from light source 602 passes through windshield 603 when reflected by the subject and received by light-receiving element 601 is halved compared to the monitoring system illustrated in FIG. 5. Accordingly, the intensity of near-infrared light passing through windshield 603 can be kept high. For example, with the configuration of the monitoring system illustrated in FIG. 5, even when the transmissivity of the near-infrared light is 90%, the roundtrip of light causes an attenuation of light of: outward path 90%×return path 90%=roundtrip 81%, whereas the configuration in FIG. 6 causes an attenuation of light of: outward path 9%×return path 90%=roundtrip 8.1% of light. Therefore, according to the configuration of the monitoring system illustrated in FIG. 6, signal loss due to light attenuation can be reduced.

[2-3. Configuration 3]

Figure 7:
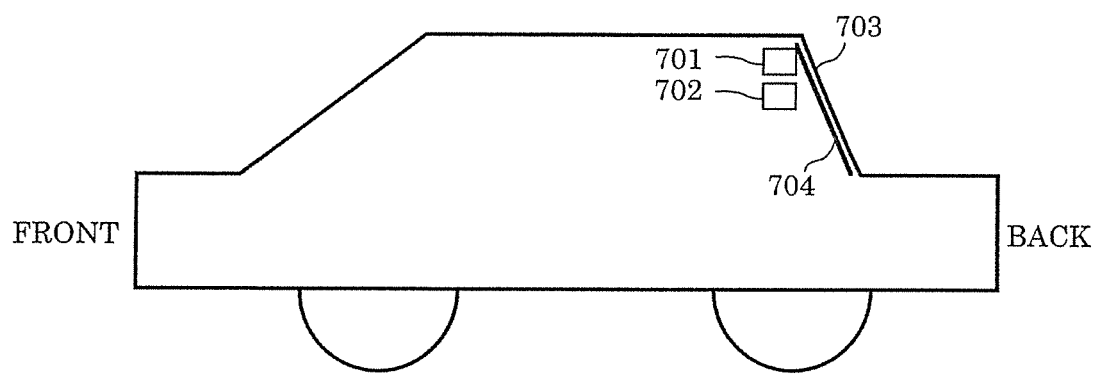
FIG. 7 is a diagram illustrating another example of a monitoring system installed in a vehicle.

Furthermore, aside from the front of the vehicle, the monitoring system according to this embodiment may be used in a system that monitors the back. FIG. 7 is a diagram illustrating another example of a monitoring system according to this embodiment.

The monitoring system illustrated in FIG. 7 includes light-receiving element 701, light source 702, and rear glass 703 to which heat-blocking filter 704 is installed. Light-receiving element 701, light source 702, and rear glass 703 correspond to the light-receiving module, the light-emitting module, and the window glass according to the present disclosure. In this manner, by installing heat-blocking filter 704 on rear glass 703 instead of on the windshield, and providing light-receiving element 701 and light source 702 to the rear of the vehicle, the back of the vehicle can be monitored. It should be noted that even when such a monitoring system is disposed at the rear of the vehicle, light source 702 may also be disposed outside the cabin.

Furthermore, although not illustrated in the figures, the monitoring system according to this embodiment may be used in monitoring a side of the vehicle. Although the back and sides of the vehicle are areas that are not illuminated by headlights, and thus are areas that are hard for a driver to check at night, monitoring the periphery, such as the back and side, of the vehicle using near-infrared light which is not visually recognizable to humans makes it possible to monitor the periphery of vehicle without the negative effects of light on a person or driver present in the periphery.

[2-4. Signal Processing Operation of Monitoring System]

Figure 8:
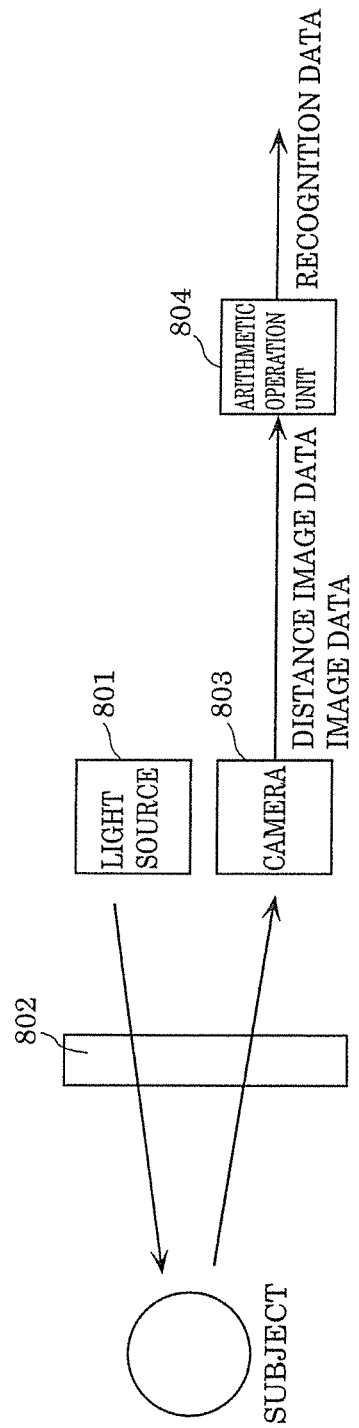
FIG. 8 is an outline diagram of a system in which signal flow is represented in abstract.

Next, the signal processing operation of the monitoring system will be described. FIG. 8 is an outline view of a monitoring system according to this embodiment in which signal flow is represented in abstract. The monitoring system includes arithmetic operation unit 804. Arithmetic operation unit 804 measures the distance between the vehicle and a subject present outside the cabin of the vehicle, based on the time from when near-infrared light is emitted by light source 801 to when the near-infrared light reflected by the subject is received by the light-receiving elements of camera 803.

As illustrated in FIG. 8, the near-infrared light emitted by light source 801 passes through window glass 802 to which the heat-blocking filter (not illustrated in the figure) is installed, and is emitted toward the subject. The emitted near-infrared light is reflected by the subject, then once again passes through window glass 802 to which the heat-blocking filter is installed, and is received by camera 803 in which a plurality of light-emitting elements (not illustrated in the figure) are arranged in rows and columns. In camera 803, for example, a near-infrared light image is obtained, recognition of the subject, for example, is performed by arithmetic operation unit 804 at a subsequent stage, and the data of the recognition result is transmitted to another system, etc., at a subsequent stage. Accordingly, the situation in the periphery of the vehicle can be monitored by the other system, etc.

Furthermore, in arithmetic operation unit 804, the time from when pulse light is emitted by light source 801 to when light reflected by the subject reaches camera 803 is measured on a pixel basis, and thus the monitoring system can also be used in applications in which the distance between the vehicle and the subject is measured using images. Furthermore, the distance from the vehicle to the subject and the positions of the vehicle and the subject may be measured using distance data, and distance information may be transmitted via arithmetic operation unit 804 to a braking processing unit (not illustrated in the figure).

Furthermore, FIG. 8 is a system diagram in which the configuration of the monitoring system illustrated in FIG. 5 is represented in abstract, and illustrates the signal processing operation when light source 801 is disposed inside the cabin. However, in the case of a system diagram in which the configuration of the monitoring system illustrated in FIG. 6 is represented in abstract, light source 801 is disposed outside the cabin, and thus the light emitted by light source 801 passes through window glass 802, to which the heat-blocking filter is installed, only during the one time when the light is reflected by the subject and received by camera 803. Therefore, in the monitoring system according to the configuration illustrated in FIG. 6, signal intensity can be further enhanced.

3. Advantageous Effects, Etc

As described above, according to a heat-blocking filter according to this embodiment, it is possible to realize a heat-blocking filter capable of substantially blocking heat while a night-vision camera or distance measuring device using near-infrared light is used.

Furthermore, a monitoring system according to this embodiment can, while enhancing a heat-blocking effect, capture images of the outside of a vehicle cabin with high sensitivity, that is, without decreasing sensitivity, even when a camera using near-infrared light is disposed inside the cabin.

It should be noted that the heat-blocking filter according to this embodiment is not limited to the above described configurations, and features such as shape, size, material, etc., may be modified as necessary in accordance with the intended characteristics. Furthermore, the monitoring system according to this embodiment is also not limited to the above-described configurations, and the arrangement of the light source, the light-receiving element, etc., may be changed as necessary.

Furthermore, the heat-blocking filter may be installed on any window glass of the vehicle. Furthermore, as a light-receiving module, a camera in which a plurality of light-receiving elements are arranged in rows and columns may be used. Furthermore, a narrow-band filter, which transmits infrared light having a wavelength range narrower than the wavelength range of light transmitted by the heat-blocking filter, may be further included in the optical lens of the camera.

Variations of this embodiment, etc., will be described below.

(Variation 1)

Modification 1 of the exemplary embodiment will be described using FIG. 9.

Figure 9:
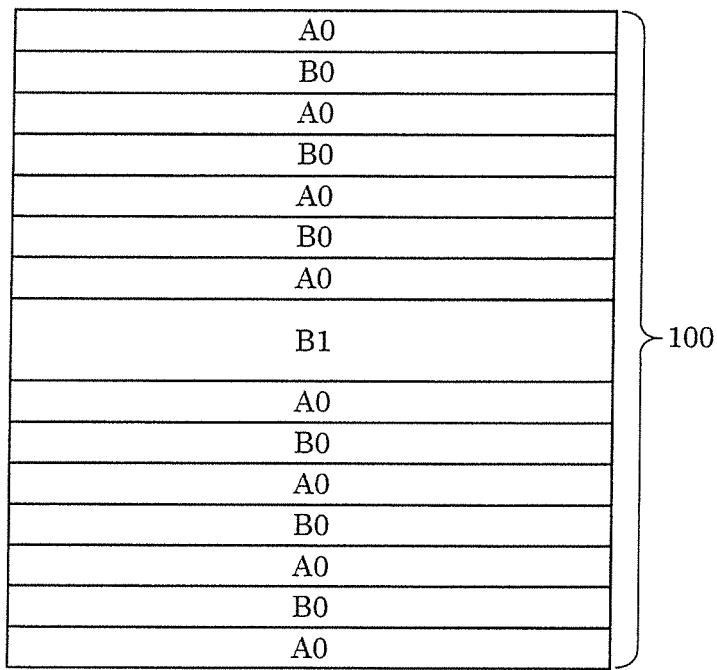
FIG. 9 is an outline view illustrating a configuration of a multilayer film filter as an example of a heat-blocking filter.

FIG. 9 illustrates the configuration of multilayer film filter 100 as a variation of the heat-blocking filter for realizing the transmissivity illustrated in FIG. 1.

As illustrated in FIG. 9, multilayer film filter 100 has a configuration in which first films A0, second films B0, and third film B1 are stacked. First films A0, second films B0, and third film B1 are films formed from a high refractive material, a low refractive material, and a low refractive material, respectively. The optical film thickness of first films A0 and second films B0 is 0.25 times the center wavelength of near-infrared transmissivity. Furthermore, the film thickness of third film B1 is different from the optical film thickness of second films B0. For example, the film thickness of third film B1 is greater than the optical film thickness of second films B0. In multilayer film filter 100, for example, light enters from first film A0 at the top of the figure and passes through first films A0, second films B0, and third film B1 toward first film A0 at the bottom of the figure. Glass member 201 either sandwiches multilayer film filter 100 from first film A0 at the top of the figure and first film A0 at the bottom of the figure, or is stuck closely to either one of first film A0 at the top of the figure and first film A0 at the bottom of the figure. Furthermore, for example, material A of first films A0 can be realized by using titanium oxide, and material B of second films B0 and third film B1 can be realized by using silicon oxide.

By configuring multilayer film filter 100 in this manner, for example, it becomes possible to set a non-transmission band from the 650 nm end wavelength of visible light to the 1100 nm end wavelength of silicon by using first films A0 and second films B0, and set a transmission band inside the non-transmission band by using the film thickness of third film B1.

It should be noted that multilayer film filter 100 is not limited to the above-described configuration, and may be any type of filter as long as the same functions are achieved.

(Variation 2)

Figure 10:
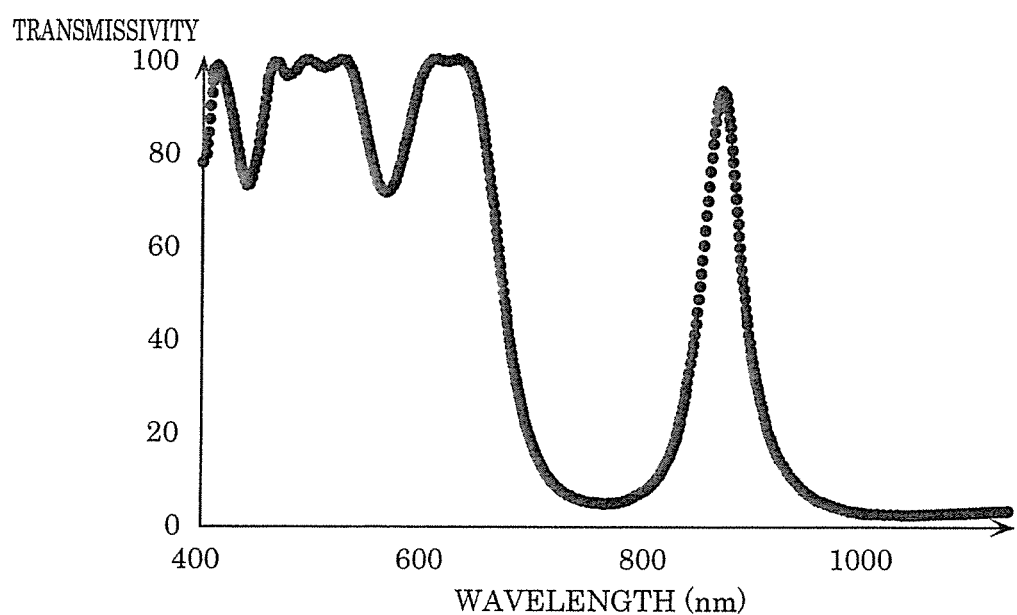
FIG. 10 is a graph illustrating an example of a narrow-band filter for near-infrared light included in a camera.

Variation 2 of the exemplary embodiment will be described using FIG. 10. In the monitoring system according to the above-described exemplary embodiment, a configuration in which only near-infrared light is transmitted may be adopted by installing narrow-band filter 805 (see FIG. 8), which substantially transmits infrared light having a second wavelength range which is a narrower band than the first wavelength range, to a camera including light-receiving elements, aside from installing the heat-blocking filter onto the window glass of the vehicle. FIG. 10 illustrates the transmissivity of a narrow-band filter included in the camera.

By installing narrow-band filter 805 onto the optical lens of camera 803 (see FIG. 8) for example, the transmissivity of light that can be received by the light-receiving elements included in camera 803 is determined by the product of the transmissivities of narrow-band filter 805 in camera 803 and the heat-blocking filter (see FIG. 8) installed in window glass 802 of the vehicle. Furthermore, combining narrow-band filter 805 in camera 803 and the heat-blocking filter installed in window glass 802 of the vehicle increases the degree of freedom of transmissivity. Furthermore, by reducing the near-infrared region to the narrow band of the second wavelength range in the camera 803-side, the unnecessary near-infrared light transmitted through the optical lens of camera 803 can be reduced. Specifically, since light is incident at various incidence angles when passing through window glass 802 to which the heat-blocking filter is installed, it is necessary to have a characteristic of having a wide band of light that can enter. On the other hand, with the narrow-band filter in camera 803, the angular range of light from the optical lens is determined, and thus it is sufficient that the near-infrared region be a narrow band. It should be noted that the second wavelength range may be set, for example, to at least 935 nm and at most 945 nm.

(Variation 3)

Figure 11:
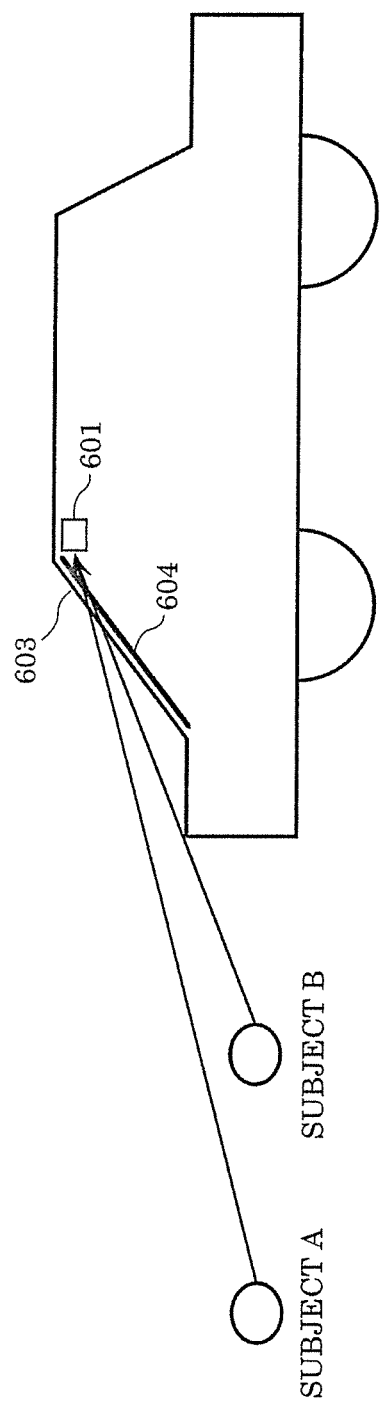
FIG. 11 is a diagram illustrating another example of a monitoring system installed in a vehicle.

Furthermore, Variation 3 of the exemplary embodiment will be described using FIG. 11 and FIG. 12. FIG. 11 illustrates an example in which light entering an in-vehicle camera passes through the window glass at various angles according to the position of subjects. Furthermore, FIG. 12 illustrates an example of light rays passing through a window glass.

FIG. 11 illustrates an example of a case where, with regard to the vehicle provided with the monitoring system illustrated in FIG. 6, two subjects are recognized. In FIG. 11, light-receiving element 601, windshield 603, and heat-blocking filter 604 are the same as light-receiving element 601, windshield 603, and heat-blocking filter 604 illustrated in FIG. 6. FIG. 11 illustrates an example in which two subjects A and B present at different locations are observed.

Figure 12:
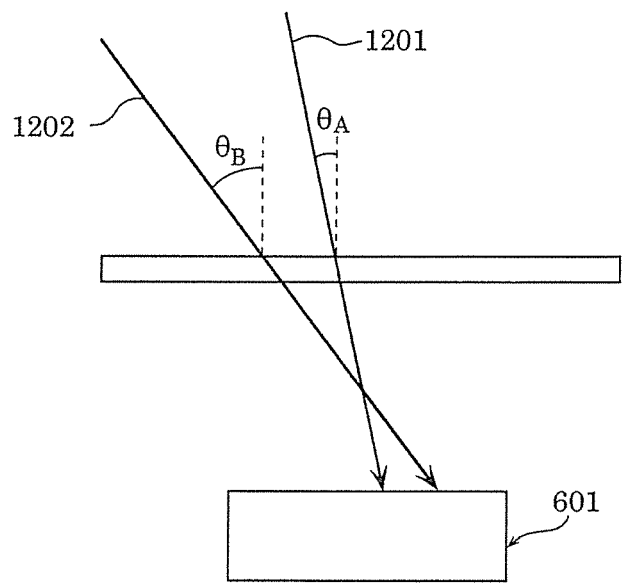
FIG. 12 is a diagram illustrating an example of light rays passing through a window glass.

In FIG. 12, light ray 1201 and light ray 1202 represent light rays reflected from subject A and subject B in FIG. 11. In the monitoring system, the first wavelength range may be a wavelength range within which infrared light incident within a predetermined incidence angle range passes through windshield glass 603. Specifically, the near-infrared light emitted by the light source and reflected by subject A and subject B, as illustrated in FIG. 11, have angles of incidence on the window glass of $\theta_A$ and $\theta_B$ as indicated by light ray 1201 and light ray 1202 in FIG. 12, and thus assume mutually different incidence angles. In this case, as long as heat-blocking filter 604 has a characteristic that allows the light of either angle to pass through, incident light can be sufficiently received. Although the configuration as in FIG. 9 does not change, it is possible to appropriately set the thickness of third film B1 in above-described multilayer film filter 100, and increase the width of the near-infrared light transmission band. Furthermore, any filter may be used as long as the same functions are achieved.

(Variation 4)

Figure 13:
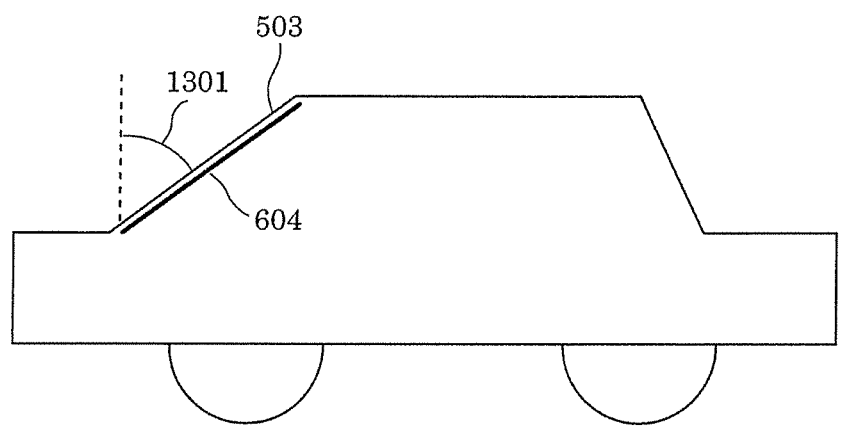
FIG. 13 is a diagram illustrating an example of an angle of a window glass of a vehicle.
Figure 14:
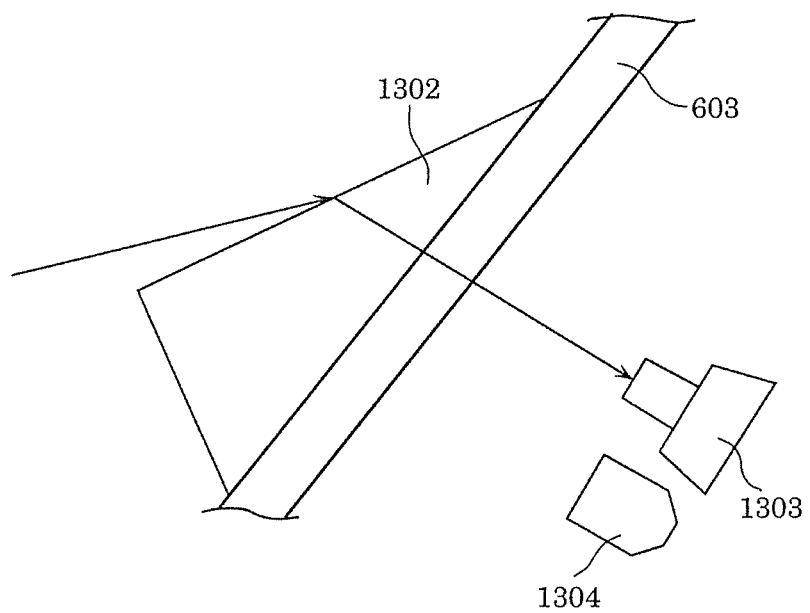
FIG. 14 is a diagram illustrating an example of a state in which a refractive component is attached to a window glass of a vehicle.

Furthermore, Variation 4 of the exemplary embodiment will be described using FIG. 13 to FIG. 16. FIG. 13 is a diagram illustrating an example of an angle of a window glass of a vehicle. FIG. 14 is a diagram illustrating an example of a state in which an attachment is attached to the window glass.

It is also possible to add an optical attachment to a window glass (windshield 603, rear glass 703, etc.), for the purpose of changing the direction of a light ray. The attachment is a refractive component which refracts, to a desired incidence angle, a light ray incident on the window glass. The attachment is, for example, formed from glass, a transparent resin, etc. Hereinafter, description will be carried out with the case of the window glass of the vehicle being windshield 603 as an example.

The angle of the window glass of the vehicle is different for windshield 603 and rear glass 703, and is also different depending on vehicle type. Meanwhile, in the case of multilayer film filter 100 such as that illustrated in FIG. 9, the wavelength of light that is transmitted is different depending on the incidence angle of the light ray incident on the window glass. For example, angle 1301 of windshield 603 illustrated in FIG. 13 ranges approximately from 0 degrees to 80 degrees with respect to the vertical direction, depending on the type of vehicle. As such, a transmission band for heat-blocking filter 604 which reflects the angle information of windshield 603 is necessary. In view of this, by disposing attachment 1302 on windshield 603 as illustrated in FIG. 14, light rays can be refracted to the appropriate direction, and thus the desired incidence angle for the camera can be maintained. This is the same with regard to the light emitted by the light source.

Figure 15:
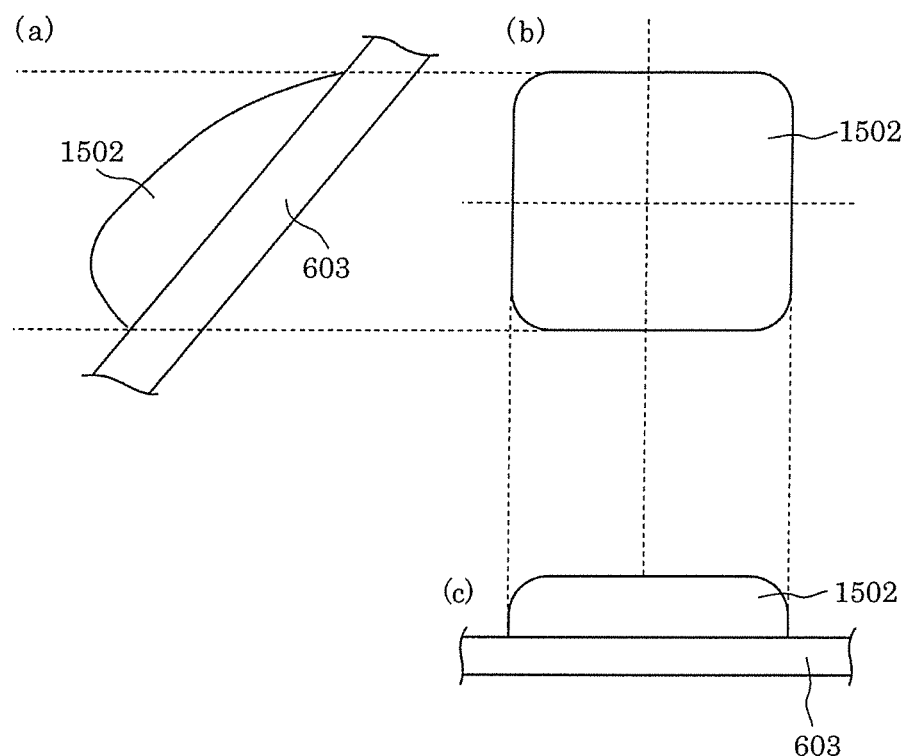
FIG. 15 is a diagram illustrating an example of a configuration of a refractive component.

FIG. 15 is a diagram illustrating an example of a configuration of attachment 1502. In FIG. 15, (a) illustrates a vertical cross-sectional shape, (b) illustrates a front view shape, and (c) illustrates a horizontal cross-sectional shape of attachment 1502 attached to windshield 603.

As illustrated in (b) in FIG. 15, attachment 1502 is substantially square in shape with the four corners of the square being formed into curves. It should be noted that the shape of attachment 1502 is not limited to the substantially square shape, and may be another shape.

Furthermore, as illustrated in (a) in FIG. 15, in attachment 1502, the face on the reverse side of the face disposed on windshield 603 is inclined with respect to the face disposed on windshield 603. Specifically, in attachment 1502, the face disposed on windshield 603 and the face on the reverse side of the face disposed on windshield 603 spread apart at a predetermined angle from the end located at the top relative to the vehicle when attachment 1502 is attached to windshield 603. Therefore, as illustrated in (c) in FIG. 15, the end that is located at the bottom when attachment 1502 is attached to windshield 603 is thick.

Furthermore, as illustrated in (a) in FIG. 15, the end that is located at the bottom is formed thicker than the end that is located at the top when attachment 1502 is attached to windshield 603. According to such a configuration, attachment 1502 can change the incidence angle of light rays incident on windshield 603.

Figure 16:
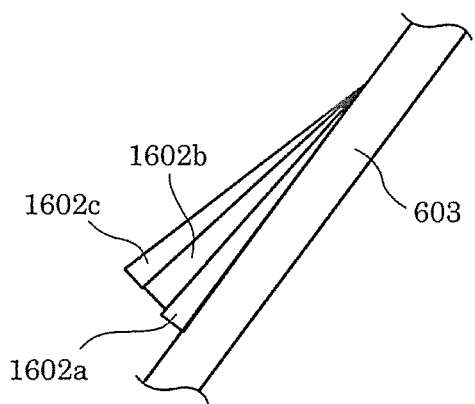
FIG. 16 is a diagram illustrating an example of a state in which a plurality of refractive components are stacked.

Furthermore, FIG. 16 is a diagram illustrating a state where a plurality of attachments are stacked. FIG. 16 illustrates a case where attachments 1602a, 1602b, and 1602c are stacked on windshield 603.

In order to conform to windshields 603 of various angles, the attachment may be configured by stacking a plurality of layers, as illustrated in FIG. 16. In FIG. 16, attachments 1602a, 1602b, and 1602c are stacked. Each of attachments 1602a, 1602b, and 1602c has, for example, the same configuration as above-described attachment 1502. For the angles of inclination of attachments 1602a, 1602b, and 1602c, predetermined standard angles may be provided. For example, 1 degree and 5 degrees may be determined as standard angles.

By stacking and using attachments having standard angles, there is no need to fabricate a plurality of types of attachments. For example, by fabricating attachments having a 1 degree angle apiece and attachments having a 5 degree angle apiece, the attachments can be combined to set arbitrary angles of 1 degree units.

It should be noted that, in the same manner as in windshield 603, rear glass 703 may include the above-described attachment.

Although a heat-blocking filter and a monitoring system according to one or more aspects have been described based on the foregoing exemplary embodiments, the present disclosure is not limited to these exemplary embodiments. Forms obtained by various modifications to the exemplary embodiments that can be conceived by a person of skill in the art as well as forms realized by combining structural components in different exemplary embodiments, which are within the scope of the essence of the present disclosure may be included in one or more aspects.

INDUSTRIAL APPLICABILITY

A monitoring system according to the present disclosure can be applied to a camera for monitoring the outside of a vehicle, a night vision camera, a distance measurement device, etc.

What is claimed is:

1. A heat-blocking filter to be installed in a window glass of a vehicle, the heat-blocking filter having an average transmissivity of at least 70 percent for visible light and infrared light in a first wavelength range, and having an average transmissivity of at most 10 percent for infrared light outside the first wavelength range, wherein
the first wavelength range is from 900 nm to 1000 nm, inclusive.

2. The heat-blocking filter according to claim 1, wherein the first wavelength range has a half-value width of at least 0.8 nm and at most 40 nm.

3. The heat-blocking filter according to claim 1, wherein the first wavelength range is a wavelength range within which infrared light incident on the window glass at a predetermined incidence angle range is transmitted.

4. A monitoring system that monitors an outside of a vehicle, the monitoring system comprising:
the window glass to which the heat-blocking filter according to claim 1 is installed; a light-emitting module that emits the infrared light having a wavelength in the first wavelength range of the heat-blocking filter;
a light-receiving module that receives and converts the infrared light having the wavelength to a signal; and
a refractive component that refracts a light ray incident on the window glass to a desired incidence angle, the refractive component being disposed on a face of the window glass on a reverse side of a face to which the heat blocking filter is installed.

5. The monitoring system according to claim 4, wherein the light-emitting module is disposed inside a cabin of the vehicle.

6. The monitoring system according to claim 4, wherein the light-emitting module is disposed outside a cabin of the vehicle.

7. The monitoring system according to claim 4, comprising:
an arithmetic operation unit that measures a distance between the vehicle and a subject present outside the cabin of the vehicle, based on a time from when near-infrared light is emitted by the light-emitting module to when the near-infrared light reflected by the subject is received by the light-receiving module.

8. The monitoring system according to claim 4, comprising:
- a camera including a plurality of light-emitting modules arranged in rows and columns, each of the plurality of light-emitting modules being the light-emitting module,
- wherein the camera obtains an image of the subject.

9. The monitoring system according to claim 4, wherein the light-receiving module includes a narrow-band filter that substantially transmits infrared light in a second wavelength range narrower than the first wavelength range.

10. The monitoring system according to claim 4, wherein the refractive component comprises a plurality of refractive components that are stacked.

11. The monitoring system according to claim 4, wherein in at least one cross section of the refractive component, a face of the refractive component on a reverse side of a face disposed on the window glass is inclined with respect to the face disposed on the window glass.

\* \* \* \* \*